United States Patent [19]

Chatfield

[11] Patent Number: 4,571,803
[45] Date of Patent: Feb. 25, 1986

[54] FABRICATION APPARATUS FOR CUSHIONED LINE SUPPORT

[75] Inventor: William W. Chatfield, Jamestown, N.C.

[73] Assignee: Transamerica Delaval Inc., Princeton, N.J.

[21] Appl. No.: 620,745

[22] Filed: Jun. 14, 1984

[51] Int. Cl.$^4$ .......................... B23P 19/02
[52] U.S. Cl. ................... 29/235; 29/33 E; 29/33 K; 29/33.52; 29/150; 29/243.57; 29/DIG. 3
[58] Field of Search ............... 29/91.5, 448, 505, 509, 29/521, 33 E, 718, 243.57, 243.58, DIG. 3, 235, 446, 33.5, 33.52, 430, 429, 417, 445, 450, 453, 717, 33 K, 150, 789, 797

[56] References Cited

U.S. PATENT DOCUMENTS

| | | | |
|---|---|---|---|
| 2,279,865 | 4/1942 | Ellinwood | 29/150 |
| 2,338,009 | 12/1943 | Peters | 29/150 X |
| 2,361,139 | 10/1944 | White et al. | 29/150 |
| 2,928,154 | 3/1960 | Koehl | 29/235 X |
| 2,955,394 | 10/1960 | Anderson et al. | 29/33.5 X |
| 3,010,195 | 11/1961 | Richards | 29/417 X |
| 3,183,701 | 5/1965 | Cain, Jr. | 29/509 X |
| 3,670,399 | 6/1972 | George | 29/243.58 X |
| 3,751,902 | 8/1973 | Kingsbury et al. | 29/450 |
| 4,144,639 | 3/1979 | Miyakawa et al. | 29/235 X |

Primary Examiner—Howard N. Goldberg
Assistant Examiner—Joseph M. Gorski
Attorney, Agent, or Firm—Hopgood, Calimafde, Kalil, Blaustein & Judlowe

[57] ABSTRACT

Partially formed metal straps are fed to a pick up point where a carriage assembly grips a strap and transports it across the path of a previously severed and loaded measured length of C-shape cushion material. The movement is coordinated with that of a clamping bar for the cushion to provide for automatic assembly of the length of cushion over and about the strap. Continued movement of the carriage assembly transports the now cushion covered strap to a forming station where a rotatable arm and toggle finger bends the strap into a circular form about a mandrel. The toggle finger is withdrawn, the mandrel is retracted, and the grip on the strap is released to deposit a completed line support into a waiting receptacle.

18 Claims, 10 Drawing Figures

FABRICATION APPARATUS FOR CUSHIONED LINE SUPPORT

BACKGROUND OF THE INVENTION

The present invention relates to line supports and, more particularly, to apparatus for assembling and forming cushioned line supports of the type that provide protection and routing support for tubes, pipes, wire bundles, cables, and the like.

A line support, as the expression is used herein, is a metal strap with an aperture at each end formed into a generally C-shape and designed to be fastened through the apertures into a closed loop around the line to be supported and to a structural support. For this purpose the strap is often provided with an elastomeric cushion cover, and one end of the strap is bent substantially at right angles to the remainder of the strap to allow the opposite end to lie flat against the structural support. Line supports of this kind are not new. Heretofore, they have been produced by hand with the aid of a few forming tools, such production being of various sizes to accommodate lines of different girth.

It is, therefore, an object of the present invention to provide apparatus for automatically producing such line supports, starting with a partially formed strap, by assembling a length of cushion material thereover, and forming the cushioned strap into a generally C-shape configuration.

A further object is to provide such apparatus that is readily adjustable to fabricate cushioned straps of different sizes.

SUMMARY OF THE INVENTION

In accordance with the invention there is provided apparatus for assembling a predetermined length of an elastomeric cushion of C-shape cross-section and a metal strap and thereafter forming the cushioned strap around a mandrel to produce a cushioned line support, which apparatus comprises in combination means for advancing a predetermined length of said cushion from a stock length onto a support member, means for severing said predetermined length from said stock length, means for gripping a given size metal strap from an infeed and transporting said strap along a path that crosses said support member and intercepts said cushion when the latter is on said support member, said path causing said strap to slip under one lip of said predetermined length of cushion while the other lip of said cushion is engaged by means associated with said support member, means for imparting movement to said cushion engaging means when said strap transporting means has crossed said support member, said movement of said cushion engaging means causing said other lip of said cushion to be released and to wrap around and lie over said strap, said gripping means being arranged to continue transporting said strap until it reaches a forming station, and means at said forming station including a mandrel for bending said cushioned strap into a generally C-shape configuration.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PREFERRED EMBODIMENT

Figures 1, 2:
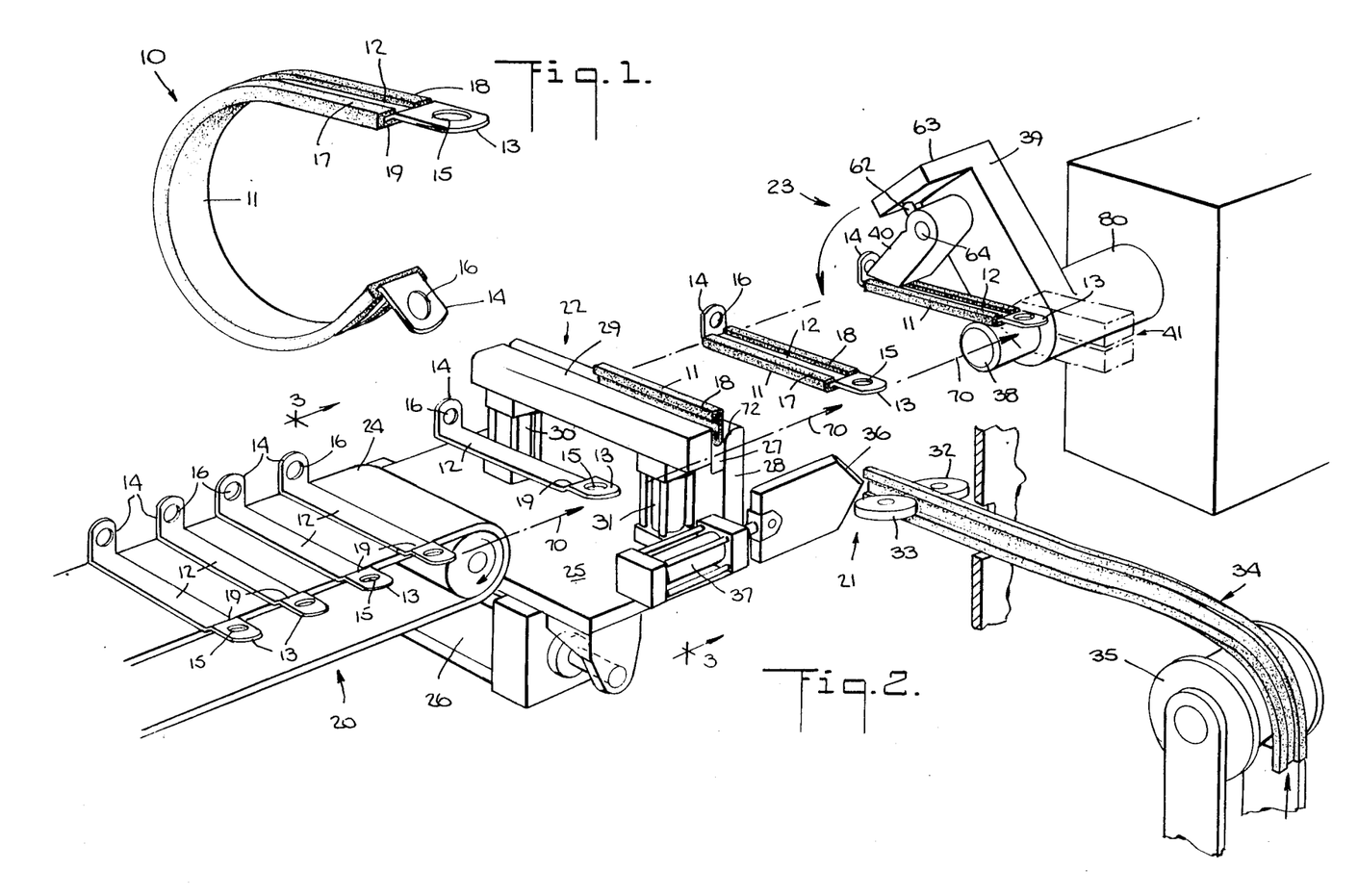
FIG. 1 is a perspective view of a completed cushioned line support as produced by the apparatus of the present invention.
FIG. 2 is a generally schematic illustration of the overall apparatus embodying the present invention.

Referring to FIG. 1, a line support is shown in perspective and designated generally by the reference numeral 10. It consists of a predetermined length of an elastomeric cushion 11 of C-shape cross-section and a metal strap 12. The length of the strap and cushion depends upon the size line support and the girth of the particular line (not shown) to be secured therein and supported. The ends 13 and 14 of the metal strap are provided, respectively, with the apertures 15 and 16 through which an appropriate fastener can be passed, first through the aperture 16 and then through the aperture 15 into a structural supporting member (not shown). The cushion 11 is shown as having lips 17 and 18 that overlie the metal strap 12. While the end 13 of the metal strap continues generally parallel to the contiguous portion of the strap material 12 with the exception of the slight offset section 19 that is provided to allow for the thickness of the cushion lips 17 and 18, the strap end 14 makes a right angle bend with respect to the remainder of the strap.

Referring now to FIG. 2, the apparatus for producing the line support 10 has an infeed mechanism 20, a cushion cut-off station 21, an assembly station 22 and a forming station 23. The infeed mechanism 20 as seen in FIG. 2 is shown schematically as a driven belt 24, but it may take the form of a vibratory feeder arranged in known manner to orient and feed the metal strap components 12 that are partially formed as shown in the drawing. The intermediate portion of the strap is straight while the end 14 has previously been bent at right angles thereto and the end 13 has been provided with the offset 19.

The assembly station 22 includes a carriage 25 whose movement is controlled by an actuator 26 and on which is mounted the support member 27 joined to the backplate 28. A moveable clamping bar 29 is positioned adjacent the support member 27 mounted for vertical movement relative to the carriage on a pair of actuators 30 and 31.

The cut-off station 21 includes a pair of drive rollers 32 and 33 that feed the cushion stock 34 from a stock supply (not shown) over a positioning roll 35. After a predetermined length of the cushion stock 34 is fed by the rolls 32 and 33 toward the assembly station 22, a cut-off blade 36 is reciprocated by an actuator 37 for severing the predetermined length 11 from the stock 34.

After assembly of the flat pre-formed strap 12 with the length of cushion material 11 at the assembly station 22 in a manner to be described below, the cushioned strap is transported to the forming station 23 to a position over a mandrel 38 where the rotatable element 39 carrying a pivoted finger 40 is rotated to engage the end 14 of the strap 12 while the end 13 is secured between the jaws of a gripping member 41, and bend the cushioned strap around the mandrel 38.

Figure 3:
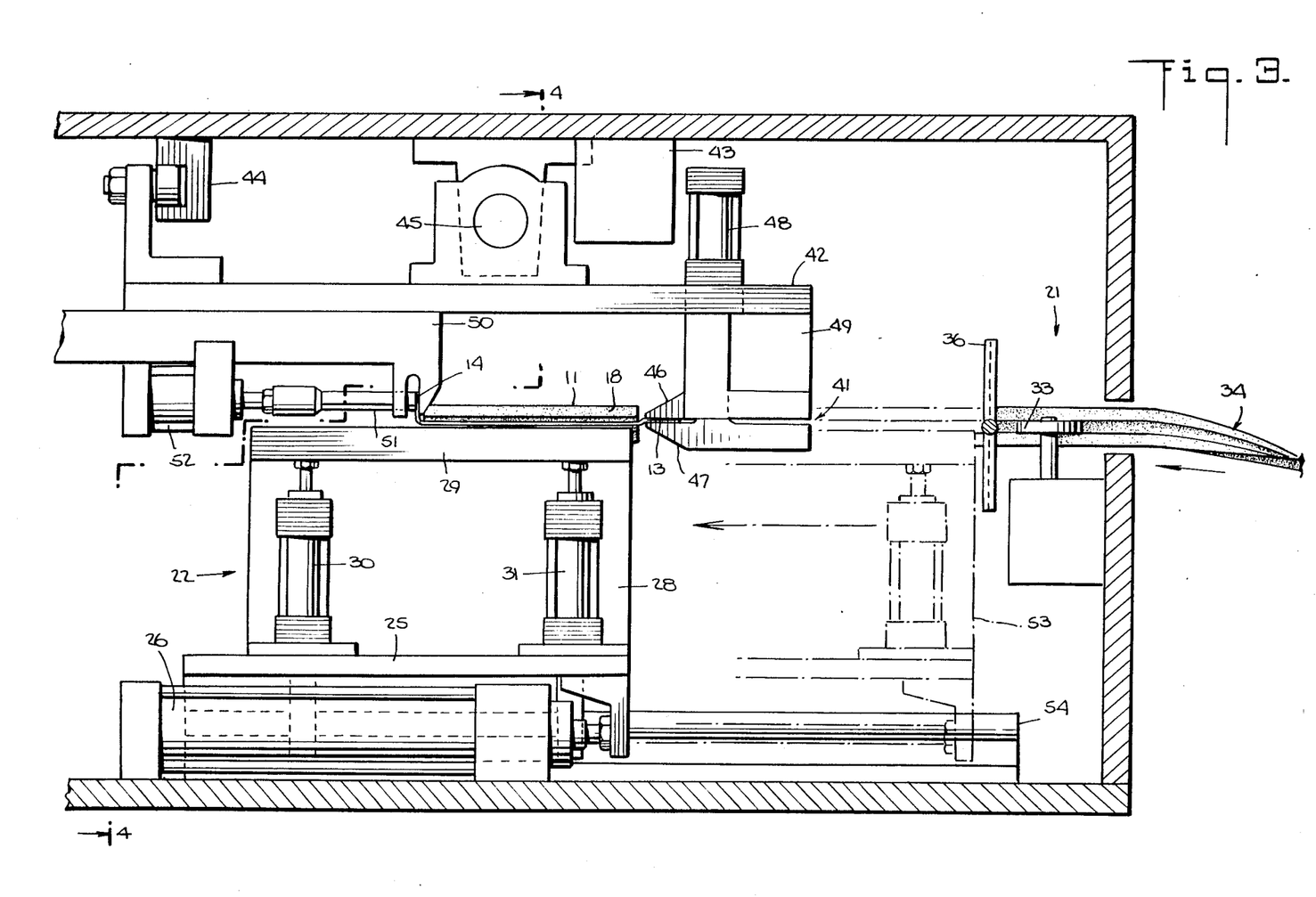
FIG. 3 is a transverse vertical sectional view taken along the line 3—3 in FIG. 2.
Figure 4:
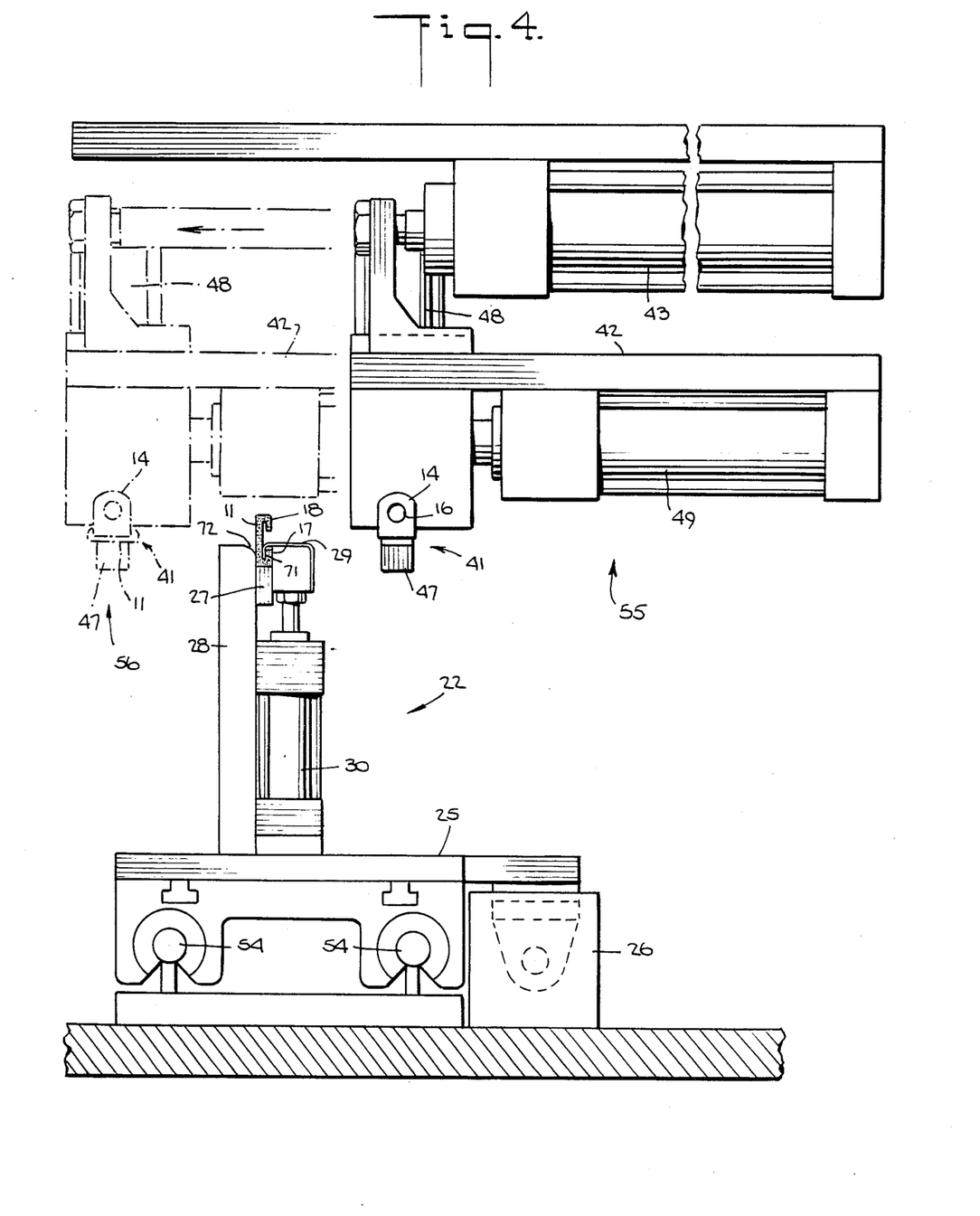
FIG. 4 is a transverse sectional view taken along the line 4—4 in FIG. 3.
Figure 6:
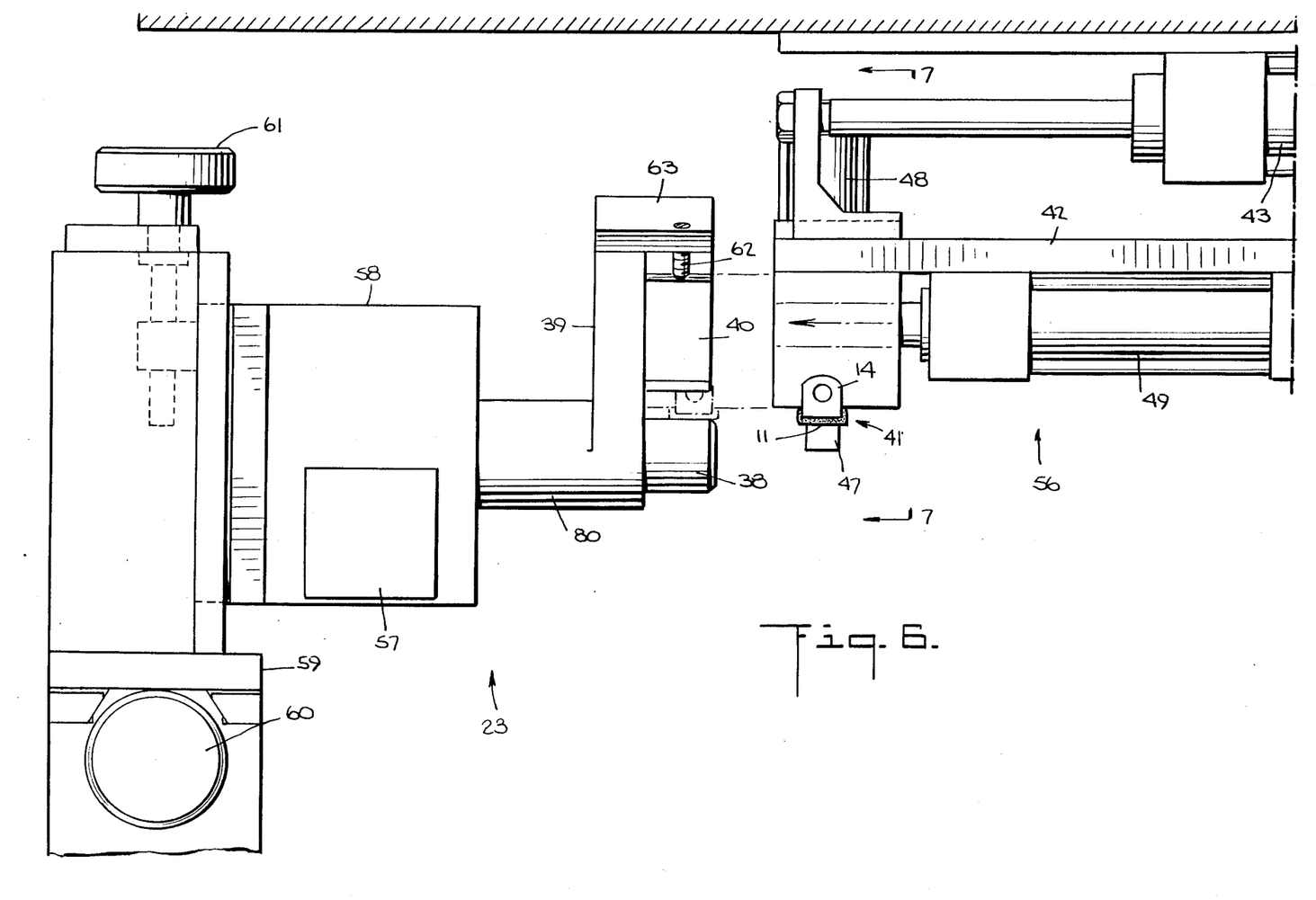
FIG. 6 is a view similar to the view of FIG. 4, but showing the forming station which is to the left of the apparatus shown in FIG. 4.

As best shown in FIGS. 3, 4 and 6, a further carriage platform 42, under the control of an actuator 43, is arranged for movement suspended from a rail 44 and a rod 45. The carriage 42 is mounted for movement along a path above and normal to the plane of the assembly station 22 for the purpose of transporting the straps from the infeed mechanism 20 through the assembly station 22 to the forming station 23. The straps are gripped at the end 13, sometimes referred to as the tail, between a fixed jaw 46 and a moveable jaw 47 of the gripping member or clamp mechanism 41. The moveable jaw 47 is positioned by an actuator 48. The clamp mechanism 41 with its actuator 48 is secured indirectly to the carriage 42 through a further actuator 49 which is fastened beneath platform 42 and arranged to move the clamp mechanism 41 relative to the carriage 42 when the carriage 42 is at the forming station as shown in FIG. 6. This will be described in greater detail below.

The right angled end 14 of the metal strap is secured between a stationary jaw 50 and a moveable clamping member 51 under the control of an actuator 52. While the relative position of the clamp mechanism 41 with respect to the carriage 42 is fixed except for the positionable control of the actuator 49, the stationary clamp 50 can be secured to platform 42 in a series of selectable locations to the right or to the left as viewed in FIG. 3 relative to the carriage 42 in order to accommodate different sizes of metal straps. The actuator 52 is fastened to the jaw 50. Therefore, the fixed jaw 50 and actuator 52, with clamping member 51, are moveable as a unit to provide for the size adjustment.

As best seen in FIG. 3, the carriage 25 with its support member 27 is moveable by means of actuator 26 from the solid line position to the broken line position 53 adjacent to the cut-off blade 36 for the purpose of receiving the predetermined length of cushion material 11. The carriage 25 rides on rails 54 and is returned to the solid line position shown in FIG. 3 when the length of cushion material 11 has been fed thereto.

As shown in FIG. 4 the actuator 43 is arranged to move the carriage 42 between the solid line position 55 where the clamping jaws 46, 47, 50 and 51 can pick up a strap from the infeed 20 (see FIG. 2) and can transport the same over the assembly station 22 to the position shown in broken lines at 56 in FIG. 4 adjacent the forming station which is more fully shown in FIG. 6. At this point the carriage 42 becomes stationary while actuator 49 takes over after the jaws 50 and 51 have released the end 14 of the strap, and continues to transport the strap with its cushion to the broken line position shown in FIG. 6 over the mandrel 38 of the forming station 23.

Figure 7:
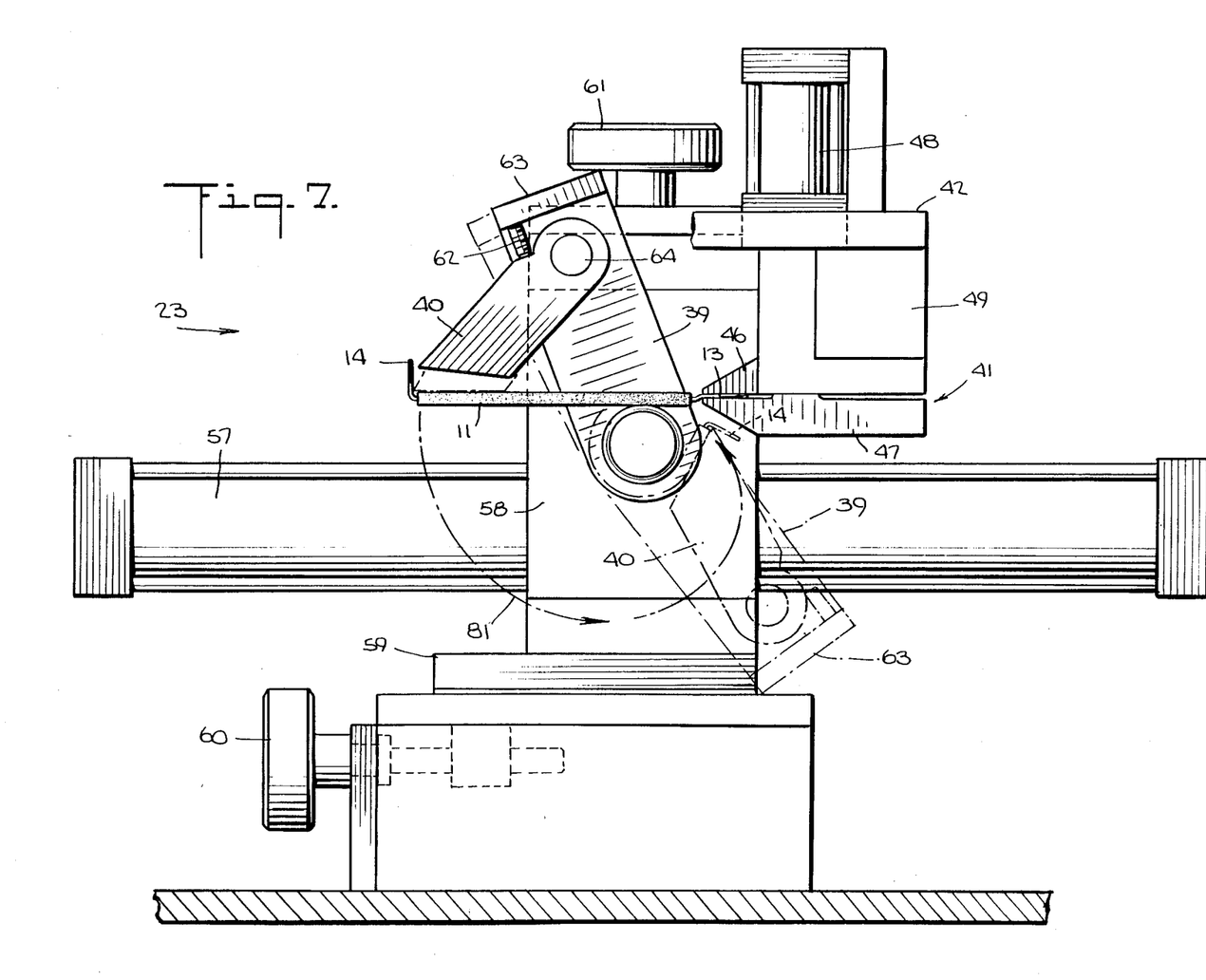
FIG. 7 is a transverse sectional view taken along the line 7—7 in FIG. 6 and showing the forming station in front elevation.

Referring specifically to FIGS. 6 and 7, the forming station 23 is provided with an actuator 57 mounted on a slide block 58 which, in turn, is mounted on an adjustable slide 59 supported by the base of the apparatus. A manual adjustment screw assembly 60 is connected to impart adjustment to the slide 59 while a further manual adjustment screw arrangement 61 positions the slide block 58 relative to the slide 59. The adjustments 60 and 61 are for the purpose of locating the center of the mandrel 38 relative to the path of the gripping member 41. The actuator 57 is coupled to impart rotary motion to the rotatable arm 39 with its finger 40. The center of rotation coincides with the axis of the mandrel 38. An adjustment screw 62 located in the top plate 63 of the rotatable element 39 is provided as an adjustable stop for positioning the finger 40 about its pivot point 64. The finger 40 is provided with a spring return urging it in the clockwise direction relative to rotatable element 39 as seen in FIG. 7. The return spring is not shown in the drawing.

Figure 5A:
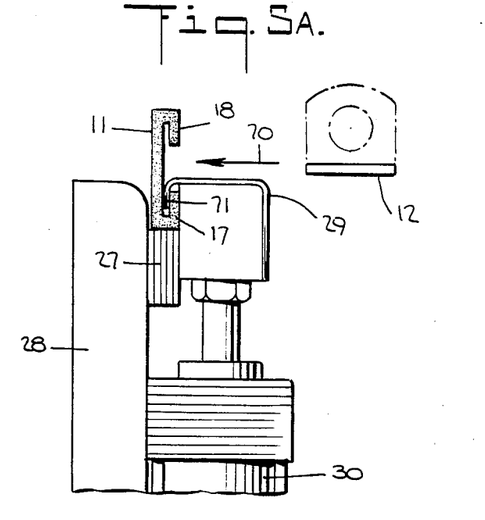
FIGS. 5A to 5D are a series of enlarged fragmentary views of a portion of the apparatus as seen in FIG. 4, and illustrating stages in the operation thereof.
Figure 5B:
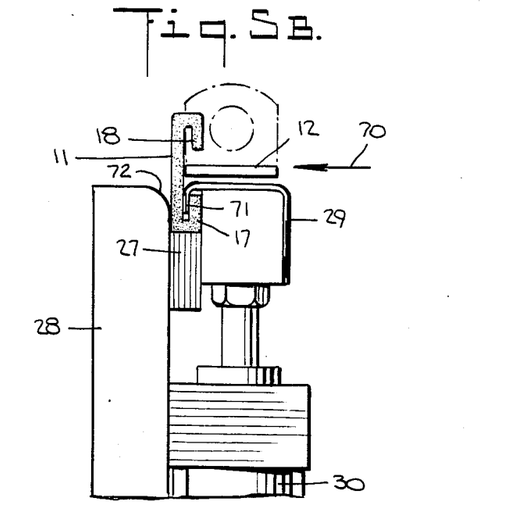
Figure 5C:
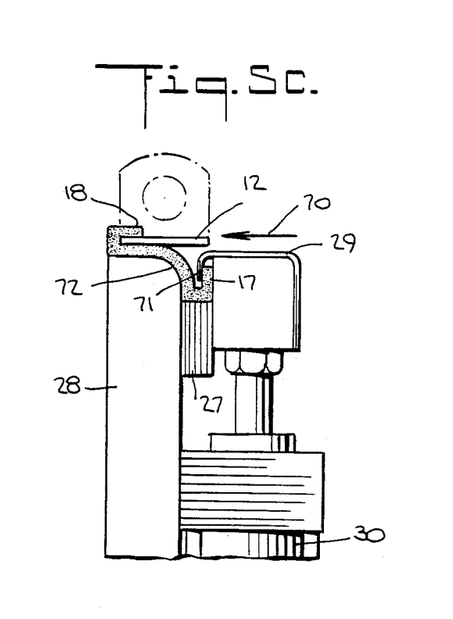
Figure 5D:
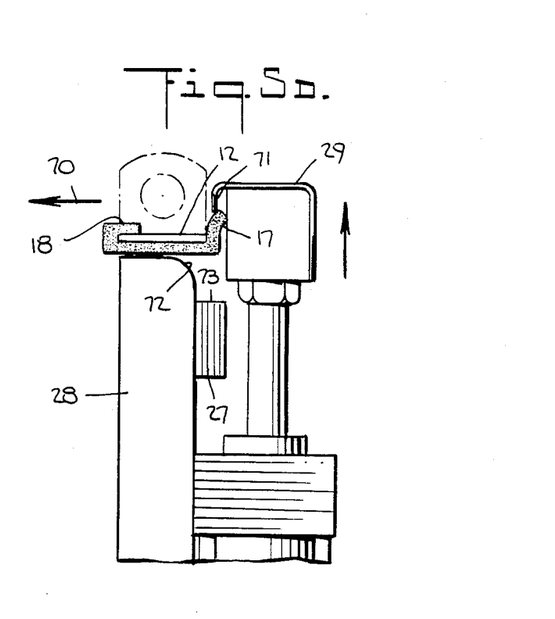

From the foregoing it will be appreciated that there has been described apparatus for assembling a predetermined length 11 of an elastomeric cushion of C-shape cross-section and a metal strap 12, and thereafter forming the cushioned strap around a mandrel 38 to produce a cushioned line support 10. The apparatus is provided with the feed rollers 32 and 33 as means for advancing the predetermined length of the cushion 11 from the stock length 34 onto the support member 27 when the latter has been moved by carriage 25 and actuator 26 to the position shown by the phantom outline 53 in FIG. 3. The blade 36 provides means for severing the predetermined length 11 of cushion material from the stock length 34 while the jaws 46 and 47 provide means for gripping the metal strap 12 from the infeed 20 and transporting the strap 12 along a path shown by the arrows 70 in FIG. 2. The path 70 crosses the support member 27 and intercepts the cushion 11 when the latter is on the support member 27 as shown both in FIG. 2 and in solid lines in FIG. 3. As best seen in FIGS. 5A to 5D, the path 70 causes the strap 12 to approach the cushion 11 and to slip under the lip 18 of the cushion 11 while the other lip 17 of the cushion is engaged by the flange 71 of the moveable clamping bar 29 which bar is associated with the support member 27. The actuators 30 and 31 provide means for imparting movement in the upward direction to the cushion engaging means or flange 71 when the strap transporting means, the carriage 42 and its gripping elements 46, 47, 50 and 51, has crossed the support member 27. The movement of the cushion engaging flange 71 causes the lip 17 of the cushion 11 to be released, as shown in FIG. 5D, and to wrap around and lie over the strap 12. The gripping member 41 and clamp 50,51 that are secured to the carriage 42 are then transported beyond the assembly station 22 and support member 27 until the carriage 42 arrives at the position shown in FIG. 6. As seen in FIGS. 5A to 5D, the support member or platform 27 of the assembly station 22 receives the cushion 11 thereon with a side edge of the cushion engaging the support surface 73 of the platform 27. The flange 71 of the bar 29 is moveable in a plane normal to the support surface 73 on the platform 27 between a first position, shown in FIG. 5A, with the flange 71 under the lip 17 of the cushion and holding the cushion against the support surface 73 on platform 27, and a second position, shown in FIG. 5D, on the other side of the strap transport path 70 from the first position shown in FIG. 5A. As best seen in FIG. 5C, the backplate 28 has a curved surface at its upper edge 72 about which the back of the cushion 11 is bent under urging of the strap 12 as the strap is transported across the support member 27 as shown in FIG. 5C to spread elastically the lip 17 of the cushion away from the cushion back. Appropriate sequencing means, not shown, is coupled to the strap-transporting carriage 42 and to the moveably supported bar 29 for moving the latter from the first position of FIG. 5A to the second position of FIG. 5D when the strap-transporting means has traveled past and clear of the moveably supported bar 29, essentially to the position shown in FIG. 5D.

At the forming station 23, although not shown in the drawings, there are provided appropriate limit stops in known manner to establish limits on the angle of rotation of the rotatable element 39. Also, the mandrel 38 is mounted for retraction within the barrel portion 80 of the rotatable member 39 subsequent to the rotational element 39 reaching the limit of its rotation which limit corresponds to completion of the bending of the cushioned strap. The final position as well as the locus of movement of the end of the finger 40 are shown by the phantom lines in FIG. 7. The sequencing apparatus is arranged to return the arm 39 to its home position as shown by the solid lines in FIG. 7 after completion of a bending operation, whereupon the jaws 46 and 47 will open releasing the end 13 of the strap at which time the mandrel 38 is retracted so as to drop the now formed strap into a waiting receptacle.

It should be observed from a consideration of FIG. 7 that the finger 40 on the rotatable element 39 engages the strap behind the bent portion 14 while bearing against the cushion 11 and is arranged to move toward the surface of the mandrel 38 as the bending of the strap progresses. Thus the locus of its movement 81 resembles an epicycloid.

The mandrel 38 is on the end of a shaft (not shown) and removable therefrom such that it can be replaced by mandrels of differing diameter depending upon the length of the strap 12 that is to be formed thereabout. With each size mandrel the center or longitudinal axis is positioned by adjustment of the screws 60 and 61 to locate the center of the mandrel at the appropriate distance from the gripping means or jaws 46 and 47. At the same time the finger 40 will require adjustment of the center of its pivot point 64 relative to the axis of the mandrel 38. Suitable adjustment means (not shown) can be provided in any suitable manner.

As mentioned previously, the finger 40 at the forming station bears against the cushion 11. This engagement serves to hold the cushion in close proximity to the bent strap end 14 and prevents it from pulling away from the end 14 as the strap is bent around the mandrel.

Sequencing of the apparatus is arranged in any suitable manner such that a subsequent length of cushion is being severed, loaded onto the support member 27, and transported to the assembly station 22, concurrently with the forming operation taking place at forming station 23 on the previously assembled strap and cushion.

Having described the presently preferred embodiment of the subject invention with reference to the accompanying drawings, it will be understood that various changes in construction may be introduced by those skilled in the subject art without departing from the true spirit of the invention as defined in the appended claims.

What is claimed is:

1. Apparatus for assembling a predetermined length of an elastomeric cushion and a metal strap to produce a cushioned strap and thereafter forming the cushioned strap around a mandrel to produce a cushioned line support, said cushion having a back joining side edges that merge into a front having spaced apart lips giving the cushion a C-shape cross-section, and said strap having two ends and a middle, said apparatus comprising in combination: means for advancing a predetermined length of said cushion from a stock length onto a support member, means for severing said predetermined length from said stock length, means for gripping a given size metal strap from an infeed and transporting said strap along a path that crosses said support member and intercepts said cushion when said cushion is on said support member, said path being located to guide said strap, while being transported, such that said strap slips under one lip of said predetermined length of cushion while the other lip of said cushion is engaged by cushion engaging means associated with said support member, means for imparting movement to said cushion engaging means when said strap transporting means has crossed said support member, said movement of said cushion engaging means causing said other lip of said cushion to be released and to wrap around and lie over said strap, said gripping means being arranged to continue transporting said strap until it reaches a forming station, and means at said forming station including a mandrel for bending said cushioned strap into a generally C-shape configuration.

2. Apparatus according to claim 1, characterized in that said support member comprises a platform for receiving thereon said predetermined length of cushion with a side edge of said length of cushion engaging a support surface of said platform, and said cushion engaging means comprises a moveably supported member with a flange which flange is moveable in a plane normal to said support surface between a first position placing said flange under said other lip of said cushion to hold said cushion against said support surface, and a second position on the opposite side of said strap transport path from said first position.

3. Apparatus according to claim 2, characterized in that said support member further comprises means adjacent said platform for providing a curved surface about which the back of said cushion is bent under urging of said strap as said strap is transported across said support member thereby to spread elastically said other lip away from said cushion back.

4. Apparatus according to claim 3, characterized in that sequencing means are coupled to said strap-transporting means and to said moveably supported member for moving said moveably supported member from said first position to said second position when said strap-transporting means has traveled past and clear of said moveably supported member.

5. Apparatus according to claim 1, characterized in that said means at said forming station comprises said mandrel, which mandrel has a longitudinal axis and an operative surface, a rotatable element mounted for rotation about an axis coinciding with said longitudinal axis of said mandrel, and means carried by said rotatable element for engaging one end of said mandrel strap and urging said one end about said mandrel upon rotation of said rotatable element while the other end of said strap is secured by said gripping means.

6. Apparatus according to claim 5, characterized in that means are coupled to said rotatable element for establishing limits on an angle of rotation of said rotatable element.

7. Apparatus according to claim 6, characterized in that said mandrel is mounted for selective retraction, and means are coupled to said mandrel and said gripping means for causing retraction of said mandrel and release of said gripping means upon said rotational element reaching said limit of its rotation which corresponds to completion of said bending of said cushioned strap.

8. Apparatus according to claim 7, characterized in that said means that is carried by said rotatable element comprises a finger constructed to engage said strap behind an end portion of the strap that is bent substantially perpendicularly to the remainder of the strap, said finger being articularly joined to said rotatable element for movement of the strap engaging part of said finger toward the surface of said mandrel as said bending of said strap progresses.

9. Apparatus according to claim 8, characterized in that said support member comprises a platform for receiving thereon said predetermined length of cushion with a side edge of said length of cushion engaging a support surface of said platform, and said cushion means comprises a moveably supported member with a flange which flange is moveable in a plane normal to said support surface between a first position placing said flange under said other lip of said cushion to hold said cushion against said support surface, and a second position on the opposite side of said strap transport path from said first position.

10. Apparatus according to claim 9, characterized in that said support member further comprises means adjacent said platform for providing a curved surface about which the back of said cushion is bent under urging of said strap as said strap is transported across said support member thereby to spread elastically said other lip away from said cushion back.

11. Apparatus according to claim 10, characterized in that sequencing means are coupled to said strap-transporting means and to said moveably supported member for moving said moveably supported member from said first position to said second position when said strap-transporting means has traveled past and clear of said moveably supported member.

12. Apparatus according to claim 5, characterized in that said support member comprises a platform for receiving thereon said predetermined length of cushion with a side edge of said length of cushion engaging a support surface of said platform, and said cushion engaging means comprises a moveably supported member with a flange which flange is moveable in a plane normal to said support surface between a first position placing said flange under said other lip of said cushion to hold said cushion against said support surface, and a second position on the opposite side of said strap transport path from said first position.

13. Apparatus according to claim 12, characterized in that said support member further comprises means adjacent said platform for providing a curved surface about which the back of said cushion is bent under urging of said strap as said strap is transported across said support member thereby to spread elastically said other lip sway from said cushion back.

14. Apparatus according to claim 13, characterized in that sequencing means are coupled to said strap-transporting means and to said moveably supported member for moving said moveably supported member from said first position to said second position when said strap-transporting means has traveled past and clear of said moveably supported member.

15. Apparatus according to claim 2, characterized in that said strap transporting means is constructed such that movement of said transporting means causes the back of said cushion to be deflected under urging of said strap as said strap is transported across said support member thereby to spread elastically said other lip away from said cushion back, and sequencing means are coupled to said strap-transporting means and to said moveably supported member for moving said moveably supported member from said first position to said second position when said strap-transporting means has traveled past and clear of said moveably supported member.

16. Apparatus according to claim 15, characterized in that said means at said forming station comprises said mandrel, which mandrel has a longitudinal axis and an operative surface, a rotatable element mounted for rotation about an axis coinciding with said longitudinal axis of said mandrel, and means carried by said rotatable element for engaging one end of said metal strap and urging said one end about said mandrel upon rotation of said rotatable element while the other end of said strap is secured by said gripping means.

17. Apparatus according to claim 16, characterized in that said means that is carried by said rotatable element comprises a finger constructed to engage said strap behind an end portion of the strap that is bent substantially perpendicularly to the remainder of the strap, said finger being articularly joined to said rotatable element for movement of the strap engaging part of said finger toward the operative surface of said mandrel as said bending of said strap progresses.

18. Apparatus according to claim 5, characterized in that said means that is carried by said rotatable element comprises a finger constructed to engage said strap behind an end portion of the strap that is bent substantially perpendicularly to the remainder of the strap, said finger being articularly joined to said rotatable element for movement of the strap engaging part of said finger toward the operative surface of said mandrel as said bending of said strap progresses.

* * * * *